US006826561B2

(12) United States Patent
Cao et al.

(10) Patent No.: US 6,826,561 B2
(45) Date of Patent: Nov. 30, 2004

(54) METHOD AND APPARATUS FOR PERFORMING A BINARY SEARCH ON AN EXPANDED TREE

(75) Inventors: Jun Cao, Sunnyvale, CA (US); Brandon Carl Smith, Antioch, CA (US); Eric Ng, San Carlos, CA (US)

(73) Assignee: Broadcom Corporation, Irvine, CA (US)

( * ) Notice: Subject to any disclaimer, the term of this patent is extended or adjusted under 35 U.S.C. 154(b) by 520 days.

(21) Appl. No.: 09/861,745

(22) Filed: May 22, 2001

(65) Prior Publication Data

US 2001/0056417 A1 Dec. 27, 2001

Related U.S. Application Data

(60) Provisional application No. 60/206,214, filed on May 22, 2000.

(51) Int. Cl.$^7$ .............................................. G06F 17/30
(52) U.S. Cl. ......................................... 707/3; 709/238
(58) Field of Search ...................... 707/3, 100; 709/238

(56) References Cited

U.S. PATENT DOCUMENTS

| | | | | |
|---|---|---|---|---|
| 5,278,789 | A | 1/1994 | Inoue et al. | 365/189.01 |
| 5,390,173 | A | 2/1995 | Spinney et al. | 370/393 |
| 5,414,704 | A | 5/1995 | Spinney | 370/389 |
| 5,423,015 | A | 6/1995 | Chung | 711/108 |

(List continued on next page.)

FOREIGN PATENT DOCUMENTS

| | | |
|---|---|---|
| EP | 0312917 A2 | 4/1989 |
| EP | 0465090 A1 | 1/1992 |
| EP | 0752796 A2 | 1/1997 |

(List continued on next page.)

OTHER PUBLICATIONS

"A High–Speed CMOS Circuit for 1.2–Gb/s 16×16 ATM Switching," Alain Chemarin et al. 8107 IEEE Journal of Solid–State Circuits 27(1992) Jul., No. 7, New York, US, pp. 1116–1120.

"A 622–Mb/s 8×8 ATM Switch Chip Set with Shared Multibuffer Architecture," Harufusa Kondoh et al., 8107 IEEE Journal of Solid–State Circuits 28(1993) Jul., No. 7, New York, US, pp. 808–814.

"Catalyst 8500 CSR Architecture," White Paper XP–002151999, Cisco Systems Inc. 1998, pp. 1–19.

"Computer Networks," A.S. Tanenbaum, Prentice–Hall Int., USA, XP–002147300(1998), Sec. 5.2–Sec. 5.3, pp. 309–320.

*Primary Examiner*—Greta Robinson
(74) *Attorney, Agent, or Firm*—Squirel Sanders & Dempsey LLP

(57) ABSTRACT

A method and apparatus for searching an electronically stored table of information including a plurality of table entries and facilitating high speed searching of a table to provide a longest matching entry. The table searching method uses at least one memory unit having a table of information including a plurality of data entries. The table of information has a plurality of search keys associated with the plurality of data entries and the plurality of search keys form a tree structure based on a prefix length for each of the search keys. The plurality of search keys are expanded such that each of the plurality of search keys has two lowest level search keys associated therewith that cover a lowest level of the tree structure. A binary search of the lowest level search keys is performed based on a search value to determine a longest prefix match. A data entry of the plurality of data entries is output based on said longest prefix match. The method is also applicable to routing data in an internet router where the routing of data packets depends on address information stored in the table of information.

18 Claims, 6 Drawing Sheets

U.S. PATENT DOCUMENTS

| | | | | |
|---|---|---|---|---|
| 5,459,717 A | | 10/1995 | Mullan et al. | 370/351 |
| 5,473,607 A | | 12/1995 | Hausman et al. | 370/392 |
| 5,499,295 A | | 3/1996 | Cooper | 380/270 |
| 5,524,254 A | | 6/1996 | Morgan et al. | 709/245 |
| 5,555,398 A | | 9/1996 | Raman | 711/143 |
| 5,568,477 A | | 10/1996 | Galand et al. | 370/229 |
| 5,579,301 A | | 11/1996 | Ganson et al. | 370/229 |
| 5,644,784 A | | 7/1997 | Peek | 710/24 |
| 5,652,579 A | | 7/1997 | Yamada et al. | 341/23 |
| 5,696,899 A | | 12/1997 | Kalwitz | 709/228 |
| 5,742,613 A | | 4/1998 | MacDonald | 714/711 |
| 5,748,631 A | | 5/1998 | Bergantino et al. | 370/398 |
| 5,781,549 A | | 7/1998 | Dai | 370/398 |
| 5,787,084 A | | 7/1998 | Hoang et al. | 370/390 |
| 5,790,539 A | | 8/1998 | Chao et al. | 370/390 |
| 5,802,052 A | | 9/1998 | Venkataraman | 370/395.72 |
| 5,802,287 A | | 9/1998 | Rostoker et al. | 370/395.5 |
| 5,825,772 A | | 10/1998 | Dobbins et al. | 370/396 |
| 5,828,653 A | | 10/1998 | Goss | 370/230 |
| 5,831,980 A | | 11/1998 | Varma et al. | 370/395.72 |
| 5,842,038 A | | 11/1998 | Williams et al. | 710/5 |
| 5,845,081 A | | 12/1998 | Rangarajan et al. | 709/224 |
| 5,887,187 A | | 3/1999 | Rostoker et al. | 712/29 |
| 5,892,922 A | | 4/1999 | Lorenz | 709/238 |
| 5,898,687 A | | 4/1999 | Harriman et al. | 370/390 |
| 5,909,686 A | | 6/1999 | Muller et al. | 707/104.1 |
| 5,918,074 A | | 6/1999 | Wright et al. | 710/52 |
| 5,940,596 A | | 8/1999 | Rajan et al. | 709/242 |
| 5,950,205 A | * | 9/1999 | Aviani, Jr. | 707/103 R |
| 5,987,507 A | | 11/1999 | Creedon et al. | 709/215 |
| 6,011,795 A | | 1/2000 | Varghese et al. | 370/392 |
| 6,041,053 A | | 3/2000 | Douceur et al. | 370/389 |
| 6,052,683 A | * | 4/2000 | Irwin | 707/8 |
| 6,061,351 A | | 5/2000 | Erimli et al. | 370/390 |
| 6,067,574 A | * | 5/2000 | Tzeng | 709/247 |
| 6,119,196 A | | 9/2000 | Muller et al. | 710/243 |
| 6,175,902 B1 | | 1/2001 | Runaldue et al. | 711/159 |
| 6,185,185 B1 | | 2/2001 | Bass et al. | 370/230 |
| 6,223,172 B1 | * | 4/2001 | Hunter et al. | 707/3 |
| 6,430,527 B1 | * | 8/2002 | Waters et al. | 703/3 |
| 6,553,002 B1 | * | 4/2003 | Bremer et al. | 370/254 |
| 6,581,106 B1 | * | 6/2003 | Dardini et al. | 709/242 |
| 6,594,268 B1 | * | 7/2003 | Aukia et al. | 370/400 |
| 6,631,419 B1 | * | 10/2003 | Greene | 709/238 |
| 6,658,482 B1 | * | 12/2003 | Chen et al. | 709/245 |

FOREIGN PATENT DOCUMENTS

| | | |
|---|---|---|
| EP | 0849917 A2 | 6/1998 |
| EP | 0853441 A2 | 7/1998 |
| EP | 0854606 A2 | 7/1998 |
| EP | 0859492 A2 | 8/1998 |
| EP | 0862349 A2 | 9/1998 |
| EP | 0907300 A2 | 4/1999 |
| FR | 2 725 573 A1 | 4/1996 |
| JP | 4-189023 | 7/1992 |
| WO | WO 98/09473 | 3/1998 |
| WO | WO 99/00938 | 1/1999 |
| WO | WO 99/00939 | 1/1999 |
| WO | WO 99/00944 | 1/1999 |
| WO | WO 99/00945 | 1/1999 |
| WO | WO 99/00948 | 1/1999 |
| WO | WO 99/00949 | 1/1999 |
| WO | WO 99/00950 | 1/1999 |
| WO | WO9900936 A1 | 6/2001 |

* cited by examiner

```
            0000        |---0000  A
A - 0XXX <              |
            0111        | |-0000  B
                        | |
            0000        | |-0011  B   A
B - 00XX <              |
            0011        | |-0100  C
                        | |
            0100        | |-0111  C   A
C - 01XX <              |
            0111        |---0111  A   default 1000        |-1000  D
D - 100X <              |
            1001        |-1001  D   default
```

Fig. 3(a)          Fig. 3(b)

```
            0000        |---0000  A
A - 0XXX <              |
            1000        | |-0000  B
                        | |
            0000        | |-0100  A
B - 00XX <              |
            0100        | |-0100  C
                        | |
            0100        | |-0111  A
C - 01XX <              |
            1000        |---1000  default 1000        |-1000  D
D - 100X <              |
            1010        |-1010  default
```

Fig. 4(a)          Fig. 4(b)

| Search Value | Result |
|---|---|
| 0 | A |
| 8 | B |
| 13 | C |
| 31 | D |
| 42 | E |
| 70 | F |
Means
[0, 8) A
[8, 13) B
[13, 31) C
[31, 42) D
[42, 70) E
[70, 4) F
Fig. 5
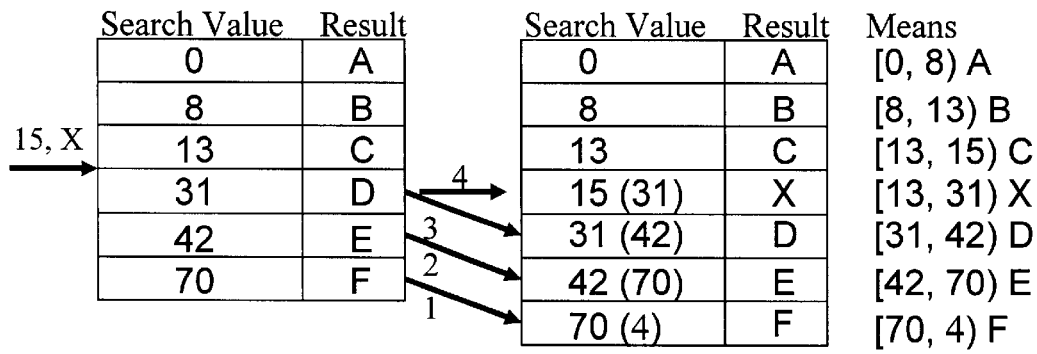
Fig. 6
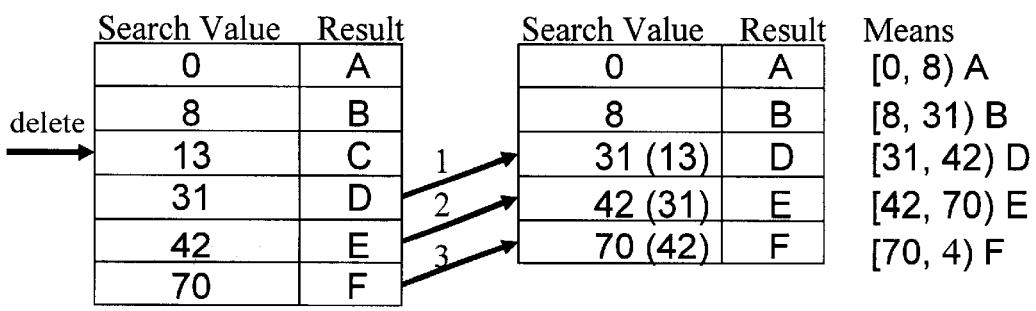
Fig. 7

METHOD AND APPARATUS FOR PERFORMING A BINARY SEARCH ON AN EXPANDED TREE

REFERENCE TO RELATED APPLICATIONS

This application claims priority from U.S. Provisional Patent Application Ser. No. 60/206,214, filed on May 22, 2000. The contents of this patent application is hereby incorporated by reference.

BACKGROUND OF THE INVENTION

1. Field of the Invention

The present invention relates generally to a method and apparatus for searching an electronically stored table of information including a plurality of table entries, and more specifically to a method and apparatus for facilitating high speed searching of a table to provide a longest matching entry.

2. Description of the Related Art

In the fields of electronic data communications and data processing, electronically stored tables of information are used in vast variety of applications to provide a mapping between two or more information spaces. The tables of information, which include a plurality of entries, may be searched in accordance with many different methods.

Generally, a search is performed using a search key, and may read one or more tables entries to determine an exact match or a best match depending on the particular application requirements. Many algorithms and devices have been developed to efficiently search tables of information.

A basic brute force method is linear searching wherein a device searches a table linearly one entry at a time. Linear searching is the simplest search method, and it is ideal for searching small tables in applications having slow search requirements. However, linear searching becomes impractical as the table sizes increase because the maximum search time is proportional to the table size.

In order to shorten the table search time, binary searching methods may be used wherein all entries of the table are sorted in a particular order, and the search times are equal to $\log_2$ (table size). Binary searching methods are particularly desirable for searching large tables using software, but sorting the table entries in a particular order is not a simple task. Due to this high maintenance requirement, binary searching is sometimes not feasible to implement in hardware.

One of the quickest methods of table searching uses content addressable memory (CAM) searching wherein all table entries are compared against a search key at the same time, and the search result is delivered to an output instantly. However, CAM searching provides high search performance at the expense of implementing greater logic using a greater amount of silicon real estate. Moreover, there is typically a limit to the size of comparison fields (i.e. data width) and the size of payload fields which may be used in CAM searching.

Some of the most common methods of table search employ hashing algorithms in which table entries are grouped into different buckets in accordance with the particular type of hashing algorithm (i.e. crc32). Searching systems employing hashing algorithms are capable of narrowing the searching area to a specific location (a bucket), and this limits the maximum searching time. The maximum table searching time is based on the size of the bucket, and the table search time remains constant as the number of buckets increases. As the number of the table entries increase, the possibility that two or more entries are hashed to a same bucket also increases. If the maximum table entry (the size of table) is considerably larger than the typical number of entries used at the same time and the hash algorithm spreads the entries evenly, there is a good chance that only one or two entries are in a bucket. In this case, the average search time will be rather short (one or two clock cycles per search). A good hash algorithm scatters table entries evenly over the search table, but there is a possibility that many table entries may hashed into the same bucket. Thus, using 100 percent of a table is not practical, and the size of the table often needs to be much larger than the typical number of table entries.

In routing and switching devices, a table of information is often used to provide a mapping mechanism for forwarding data, typically in the form of a packet (e.g., an Ethernet Packet), from one location to another location. As packets arrive at each of a plurality of associated ports of a switch or router device, the information stored in the table must be searched to determine an appropriate action.

For example, if the table includes an entry providing a direction for the arrived packet, the device forwards the packet in the direction indicated. If the table does not include an entry providing a direction for the arrived packet, the device may handle the packet based on a default setting. Examples of default settings include sending the packet to all available ports (broadcasting), sending the packet to a central processing unit (CPU) for analysis in accordance with a predefined set of rules, or dropping the packet. For Ethernet routing applications, a table of information is typically organized based on particular fields (e.g., a medium access control (MAC) Address, an IP Address, a Virtual LAN ID, etc.) of a packet. When particular fields of the packet match particular fields of the table, the device utilizes the corresponding information in the table to forward the packet.

Presently, worldwide networking is undergoing a shift. Internet Protocol Version 6 (Ipv6) is being implemented. IPv6 is the "next generation" protocol designed by the IETF (The Internet Engineering Task Force) to replace the current version Internet Protocol, IP Version 4 ("IPv4"). Most of today's internet uses IPv4, which is now nearly twenty years old. IPv4 has been stable and resilient, but it has several problems. Most importantly, there is a growing shortage of IPv4 addresses, which are needed by all new machines added to the Internet. IPv6 addresses the limited number of available IPv4 addresses and adds other improvements to IPv4 in areas such as routing and network autoconfiguration. IPv6 is expected to gradually replace IPv4, with the two coexisting for a number of years during a transition period.

A recent enhancement to Internet addressing is Classless Inter-Domain Routing (CIDR). With the advent of CIDR, the original class-based scheme has mostly been discarded. Instead, subnetting is used to divide "CIDR blocks" of arbitrary size into smaller "CIDR blocks", a process that can be repeated.

Faced with exhaustion of class B address space and the explosion of routing table growth triggered by a flood of new class Cs, IETF began implementing CIDR, in the early 1990s. The primary requirement for CIDR is the use of routing protocols that support it, such as RIP Version 2, OSPF Version 2, and BGP Version 4.

The Optical Carrier system provides international standards for data rates. For OC-192, the data rate is 9.6 Gbs/second. At the heart of a wire speed OC-192 router is a lookup engine, capable of providing the destination information based on an Internet Protocol Destination Address (IPDA) every 50 ns. As discussed above, CIDR requires a lookup to be based on longest match. For a backbone router, the size of the lookup database is in the order of 256K to 512K entries.

In the prior art, there is no system or method to accomplish these tasks and that is capable of being scaled to work on both Ipv4 and Ipv6 environment, where the IPDA is 32-bit and 128-bit respectively.

SUMMARY OF THE INVENTION

It is an object of the present invention to provide a method and apparatus for facilitating high speed linear searching of a table of information by expanding each terminating node to the lowest level. It is also an object of the present invention to provide a high performance and cost effective method and apparatus for facilitating high speed longest-prefix-match searching of a table.

In one embodiment, the present invention is directed a table searching method that uses at least one memory unit having a table of information including a plurality of data entries. The table of information has a plurality of search keys associated with the plurality of data entries and the plurality of search keys form a tree structure based on a prefix length for each of the search keys. The plurality of search keys are expanded such that each of the plurality of search keys has two lowest level search keys associated therewith that cover a lowest level of the tree structure. A binary search of the lowest level search keys is performed based on a search value to determine a longest prefix match. A data entry of the plurality of data entries is output based on said longest prefix match. The method is also applicable to routing data in an internet router where the routing of data packets depends on address information stored in the table of information.

In addition, the method is also applicable to routing data in an internet router where the routing of data packets depends on address information stored in the table of information. Similarly, the table searching method may employ a plurality of search keys based on a subset of Internet Protocol Destination Addresses and the binary search is performed of the lowest level search keys based on an input Internet Protocol Destination Address.

In addition, the table search method is applicable when the binary search of the lowest level search keys is based on an input Internet Protocol Destination Address having a length of 32 bits for IPv4, and based on an input Internet Protocol Destination Address having a length of 128 bits for IPv6.

The above and other objects, features and advantages of the invention will become apparent from the following description of the preferred embodiment taken in conjunction with the accompanying drawings.

BRIEF DESCRIPTION OF THE DRAWINGS

FIGS. 3(a)–(c) illustrates a portion of the tree diagram for a table for a 4-bit search key employing one method of expanding the entries of the table.

FIGS. 4(a)–(c) illustrates a portion of the tree diagram for a table for a 4-bit search key employing one method of expanding the entries of the table.

FIG. 5 illustrates stable table search without insertion or deletion of entries.

FIG. 6 illustrates the insertion of an entry that induces a series of downshift operations.

FIG. 7 illustrates the deletion of an entry that induces a series of upshift operations.

DESCRIPTION OF THE PREFERRED EMBODIMENTS

Before discussing the embodiments of the present invention, the architecture of IP addresses must be dealt with. Every IP diagram carries a destination address organized in the following manner where the IP-address::= {<Network-prefix>, <Host-number>}. The Network-prefix describes the destination network, and the Host-number described the specific hosts on the destination network.

For CDIR, the boundary between Network-prefix and Host-number is not fixed. The Network-prefix is a continuous set of bits at the more significant end of the address that defines a set of systems, and the Host-number selects among those systems. Furthermore, there is no requirement that all the internet use the network prefixes uniformly. This means, that in a CDIR routing table, there might be sets of destinations that exhibit a subset relationship, e.g. {129.x.x.x, 129.200.x.x, 129.200.9.x}. The router must use a longest matching entry when forwarding the datagram; e.g. 129.200.9.x to forward IPDA=192.200.9.6 and 129.200.x.x to forward IPDA=192.200.10.2.

Figure 1:
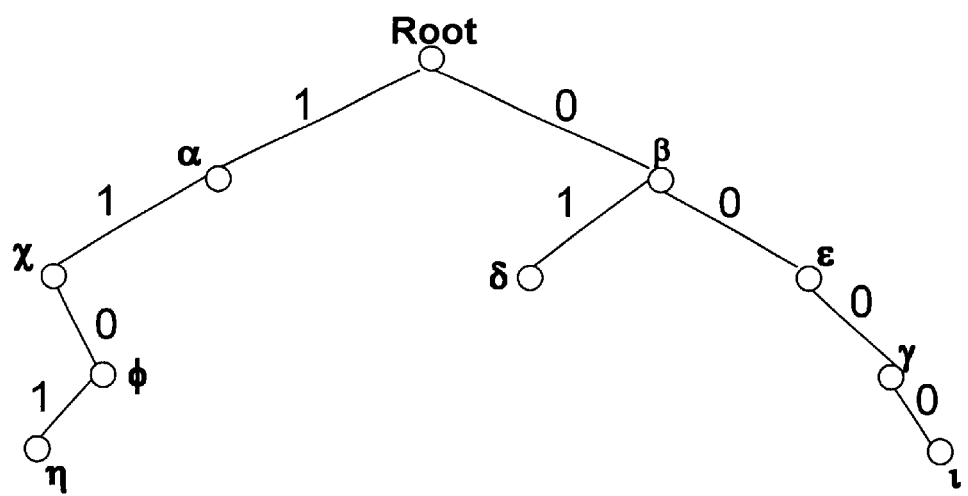
FIG. 1 illustrates a typical tree diagram for a 4-bit search key.

In the context of the present invention, searching a longest-match-table is like traversing a binary tree. FIG. 1 illustrates a typical tree for a 4-bit search key. With 32-bit search key, there would be a 32-layer tree. With such a tree, entries 0101, 0100 all use the destination information of the shaded entry, marked as δ, because that's the furthest that can be traversed, and thus the longest match.

The drawbacks of the above scheme includes: 1) the maximum number of steps required to find an entry is linearly dependent to the key length and independent of the number of entries in the database; 2) it is very difficult to add an entry into the tree; and 3) it is very difficult to pipeline the search.

However, if each terminating node is expanded to the "leaf" layer of the tree, the problem of longest match search becomes a binary search on the leaf notes. This is the method employed by the present invention.

Figure 2A:
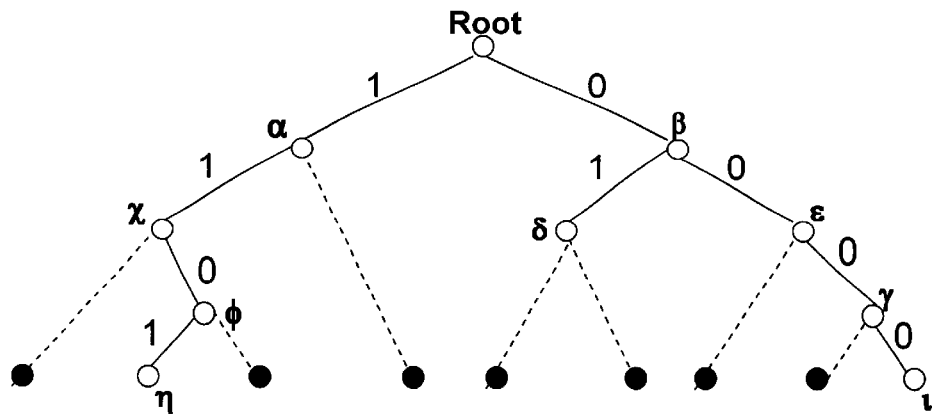
FIGS. 2(a)–(c) illustrates a tree diagram for a 4-bit search key employing the methods of the present invention.
Figure 2B:
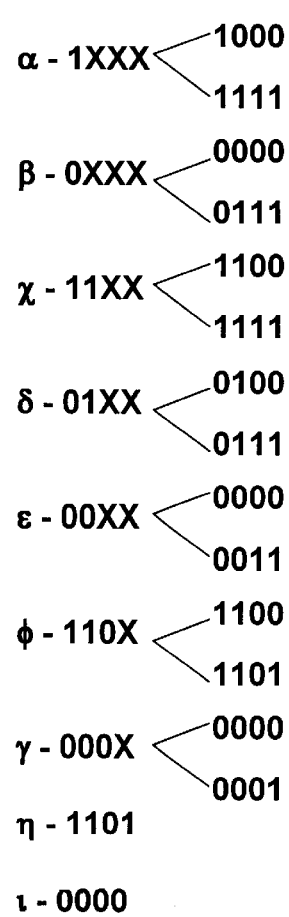
Figure 2C:
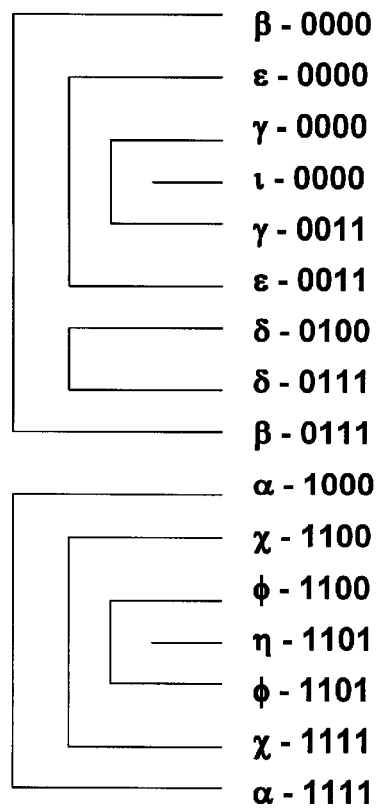

FIG. 2 illustrates this method. Expansion is performed by creating two entries out of every entry that does not reach the "leaf" layer, as illustrated in FIG. 2(b). Thus, the entry at δ, illustrated in FIG. 2(a), 01XX, is expanded to 0100 to reach the lowest level, the entry at α, 1XXX, is expanded to 1000, and the entry at χ, 11XX, is expanded to 1111, as illustrated in FIGS. 2(b) and (c). As illustrated for the 4-bit example, similar expansions occur for the 32-bit case. 128.x.x.x is expanded to 128.0.0.0 and 128.255.255.255. The two expanded entries bracket the original entry's domain of influence and allows those entries to be searched.

More specifically, the entry 128.255.255.255 is allowed to point to the destination information of 128.x.x.x, that includes entries between 128.0.0.0 and 128.255.255.255, and points to the destination information of the longest valid prefix that encloses 128.x.x.x. According to the present invention, one of the brackets is incremented by one to simplify the process. The process of modifying the expanded entries is discussed in more detail below.

If the expanded entries are not modified, i.e. not adding 1 to the lower entries, the lower entries would have to store two pointers. One would be used when there is an exact hit, and the other would be used when there is a "miss". For example searching for 1001 will use D, since there is an exact hit, but searching for 1100 will use default, because it is a miss and 1001 is the largest entry that smaller than the search value of 1100. This is illustrated in FIG. 3(a), where each entry represents a point on the bottom layer of the tree illustrated in FIG. 2. The regions provided in FIG. 3(b) an be thought of as the bottom row of dots in FIG. 2 and cutting the rest of the tree structure away.

Instead, the present invention modifies the lower entries by adding 1 to them. Then, the method described below is used to assign the destination value corresponding to the modified lower entry. This allows for storage of one pointer per entry. Using the same examples discussed above, the method of the present invention is illustrated in FIGS. 4(a) and (b). When searching for 1001, this time it is a miss. The destination value related to 1000 is used, because it is the largest value smaller than 1001. The pointer corresponding to 1001 is D. Now, for 1100, that value is still a miss, and the value corresponding to 1010, which is a default, is used. Thus, the present method achieves the same result without having to store two values.

It is noted that both schemes have duplicate entries when performing expansion. The former solves the problem by selectively throwing out the duplicate entries. The latter stores them in a special section of the memory. In the implementation, the memory is separated into Search and Duplicate sections. There are no duplicate entries in the search section and this section is where the binary search is being performed. This allows for the table to be updated dynamically.

With respect to this updating, the question arises as to where to insert a new entry. If the pattern matches exactly and they are both TOPS, then the shorter length is inserted above. Else if the pattern matches exactly and they are both BOTTOMS, insert longer length above. Else if the pattern matches exactly BOTTOM goes above TOP, regardless of length. For duplicate TOPS, the one with the longer length stays in the search section of memory. For duplicate BOTTOMS, the one with the shorter length stays. For mixed TOPS and BOTTOMS, the TOP stays.

When adding a range, both the TOP and BOTTOM pointers must be determined. The TOP pointer is always the pointer associated with the prefix. The BOTTOM pointer is the pointer of the entry just above the new range's TOP. The entry just above the new range's TOP may be a TOP or BOTTOM. The default prefix is a special case, both its TOP and BOTTOM pointers are the same. Also when adding a range, which bottoms need to be updated must be determined and how that updating should occur. Not all of the BOTTOMS in the range that are added are effected. The entries in the added range are searched until the first TOP is found. Searching down the entries continues until the BOTTOM associated with the first TOP is found and its pointer is updated with the added range's TOP pointer. Other BOTTOMS may be passed before the BOTTOM associated with the first TOP is found, with these other BOTTOMS not being updated. This process is continued until the next TOP is found and its associated BOTTOM. This is repeated until the end of the added range is reached. All the entries in this update process must be included, both in and out of the main search portion of the memory.

Similarly, when deleting a range, how and which BOTTOMS need to be updated in the deleted range must be determined. The range is searched until the first TOP is located. The searching continues down the range until the BOTTOM associated with the first TOP is found and its pointer is updated with the deleted range's BOTTOM pointer. The process continues down until the next TOP is found and then its associated BOTTOM . . . This process is repeated until the end of the deleted range is reached. Deleting 1* prefixes is a special case, since its BOTTOM pointer is the same as its TOP pointer. In this case, the BOTTOM pointer is updated with the pointer just above the deleted range's TOP.

One of the biggest problems pertaining to lookup algorithms that uses a binary search is that the search database must be sorted and stable. Therefore, when table update, insertion or deletion takes place, searching must be temporary suspended. This limitation is intolerable in high speed routers today, where lookup table sizes are enormous and updates take a long time, and at the same time, the packet throughput is large. Suspending lookup means adding jitter to the packet processing latency, and large jitter is unacceptable for multimedia traffics. Suspending lookup also means the system needs to provide large buffer spaces to store the packets being held up during the suspension. Thus, it is important for binary searches to be performed even while entries are being added or deleted from the database.

The traditional way of combating the above problem is using a shadow table method, in which the search database is duplicated. While table maintenance is being performed on one table, search is being performed on the other. A ping-pong algorithm is used to toggle the tables between search and maintenance status. This algorithm, however, requires the search memory to be doubled.

An embodiment of the present invention uses a method which is performed on top of the binary search on an expanded tree, discussed above. This embodiment solves the stated problem without doubling the memory requirement. FIG. 5 illustrates a stable search table. FIG. 6 illustrates an entry being inserted into the table, which induces a series of downshift operations, and FIG. 7 illustrates an entry being removed from the table, which induces a series of upshift operations. The steps of the add and delete operations are also indicated in the figures. Furthermore, the old values in each entry is incorporated inside the parentheses.

The "Means" column illustrates what each entry means and the items under the "Means" column changed from FIG. 5 indicate the impact the upshift or downshift has on the meaning of the table. The present invention stores a small cache of these changed "Means" entries. After the search result is obtained using the traditional binary search method, they are quickly cross-referenced in this small cache. If a hit is generated, the search value will be modified or compensated using the cached result. The size of the cache depends on the ratio between the search latency and frequency of the update shifts. In other words, if a maximum of M shift operation can take place within the search latency, the cache needs to contain no more than M entries.

In summary, using this search compensation method on top of binary search on an expanded tree process allows a table search to take place simultaneously with table update, without storing two copies of the search database.

The search is performed on this database that only contains keys of maximum length from this method, instead of a tree structure. Each of the entries is inclusive of intervening entries and simplifies the search. Using this method, a binary search can be performed based on the IPDA. If a hit occurs, the destination information is used that was pointed to by the entry. If a miss occurs, the destination information is pointed to by the largest of the entries that is smaller than the IPDA used.

The advantages of this method include: 1) the search time depends logarithmically on the total number of database entries, and is independent of the length of the key. Consequently, this method scales well to Ipv6. 2) Adding an entry is easier than the tree search described above. 3) The database can be organized so pipelining is possible.

The pipelining of the present method will be briefly discussed. The present method turns the longest prefix match search into a binary search. A system is required to support 512K longest match entry, and is equivalent to a 1024 K or 1 Meg binary search. It is well known that for a database of 1 Meg entries, at worst case, it takes 21 searches to provide the search result. At OC-192 speed, a lookup must be performed in under 50 ns. This requires memory access bandwidth of 525 MHz. However, by storing some intermediate entries in an internal table, the search can be pipelined.

For example, if every other of 1K entries is stored, i.e. tries 1, 1024, 2048, . . . , etc. in an 1K-entry internal table, the search can be pipelined. When datagram A comes in, a primary on the internal table is performed, then based on that result, a secondary search is performed on the external table, while the primary search on datagram B is being performed. In this case, results can be obtained in 11 searches or memory bandwidth of 275 MHz.

Figure 8:
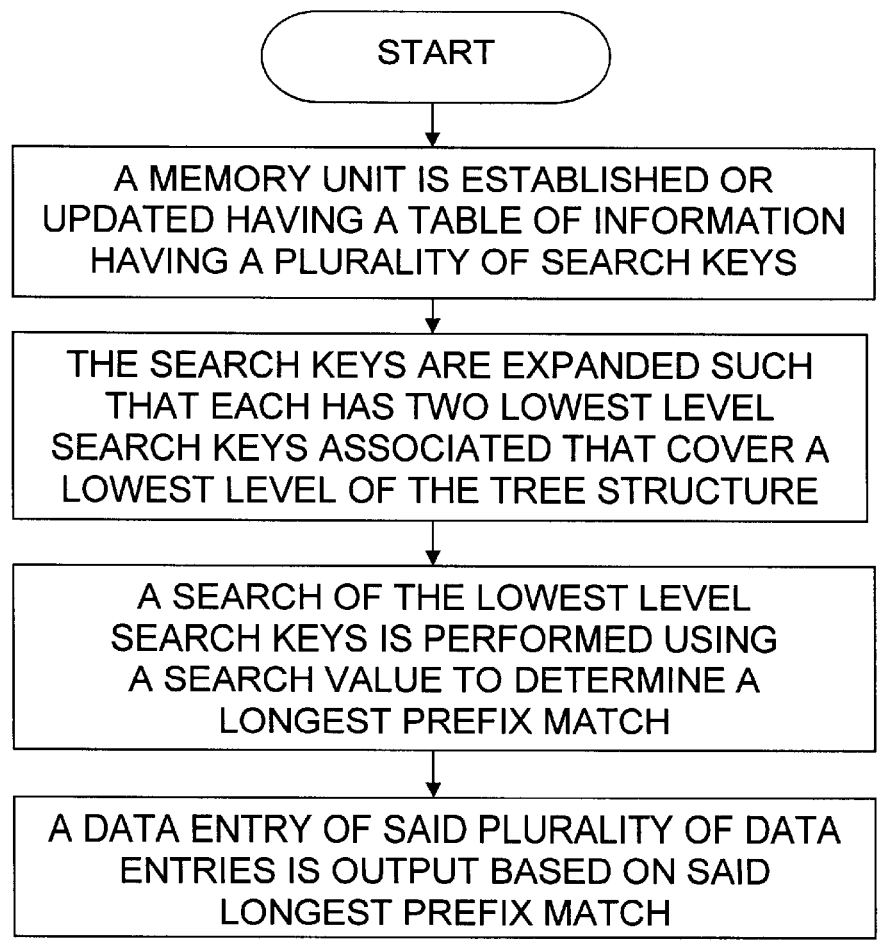
FIG. 8 is a flowchart illustrating the method of one embodiment of the present invention.

A method according to one embodiment of the present invention is illustrated in a flow chart provided in FIG. 8. First, a memory unit is established or updated having a table of information. The table has data entries and a plurality of search keys associated with the data entries. The plurality of search keys form a tree structure based on a prefix length for each of the search keys. The plurality of search keys are expanded such that each of the plurality of search keys has two lowest level search keys associated therewith that cover a lowest level of the tree structure. A binary search of the lowest level search keys is performed based on a search value to determine a longest prefix match. Finally, a data entry of said plurality of data entries is output based on said longest prefix match.

In another embodiment of the present invention, the method for performing a binary search on an expanded tree may be used to implement virtual tables. Allowing multiple routing tables to be stored in one physical table is very useful in today's Internet routers, where traffic engineering is a crucial part of the router's make up. For example, an internet site is assigned a specific IP address. A router might see millions of IP packets that are destined to this specific IP address. Using a traditional routing method, all IP packets would go out the same port of the router, because they all have the same destination IP Address, and the output port is indicated by a longest-prefix-match routing table.

However, if the router supports virtual tables, packets with the same destination IP address can be searched in different routing tables. The table selection can be based on various algorithms. The algorithm can be as complicated as using the packet's source IP address, Quality of Service fields (TOS field), or the upper layer traffic type (IPP field). The algorithm can be as simple as using the packet's ingress port. The result allows routers to make smarter routing decisions.

The binary search on an expanded tree, as described above, allows a very simple implementation of a virtual table, by simply appending a V-bits virtual table tag in front of each table entry. This allows a single routing table to support $2^V$ virtual tables. The method also requires a default entry to be added for each virtual table. The default entries are expanded to be the smallest and the largest value entries for each table, according to the present invention. Table 1 below illustrates the initial table setup for a routing table that supports 4 virtual tables. When new entries are added to the table, the virtual table tags are appended before expansion. The entries will then be inserted between the expanded default entries of the corresponding virtual table.

TABLE 1

| Search Comparison Tag | | Search Result |
| --- | --- | --- |
| Virtual Tag | IP Address | Routing Decision |
| 00 | 0.0.0.0 | default VT0 |
| 00 | 255.255.255.255 | default VT0 |
| 01 | 0.0.0.0 | default VT1 |
| 01 | 255.255.255.255 | default VT1 |
| 10 | 0.0.0.0 | default VT2 |
| 10 | 255.255.255.255 | default VT2 |
| 11 | 0.0.0.0 | default VT3 |
| 11 | 255.255.255.255 | default VT3 |

For every packet routed, the virtual table tag is appended in front of the IPDA using a predefined algorithm, e.g. ingress port. Any search that results in a miss will be captured by the default entry of the corresponding virtual table.

As discussed above, adding entries into a table is easier under the method of the present invention. Another embodiment of the present invention allows further ease in both adding and deleting entries in a table.

To increase the update speed for a table, the amount of data shifting required during entry addition and deletion should be limited. This is achieved by, first, partitioning the entire search memory into M blocks. When the amount of data shifting require during addition exceeds a preset limit N blocks, (N<M), a new block will be insert below the current block to limit the data shifting. When the amount of data shifting required during deletion exceeds the preset limit N, the shifting will be stopped at the end of the current block by creating a duplicate entry out of the last entry of the current block.

When an entry is added to the table, the update process looks at all entries between the insertion and N-1 blocks from the bottom of the current block to see if there are any unused/duplicates entries. If the search is positive, the entry is inserting by shifting data downwards to replace the nearest unused/duplicated entry. Otherwise, the update process looks at all entries between the insertion point and N-1 blocks from the top of the current block to see if there are any unused/duplicated entries. If the search is positive, the entry is inserted by shifting data upwards to replace the nearest unused/duplicated entry. If both searches fail, the amount of data shifting required will exceed the preset limit N blocks so a new block will be inserted N-1 blocks below the current block. Then the entry is inserted by shifting data downwards to replace the nearest unused/duplicated entry.

Figure 9:
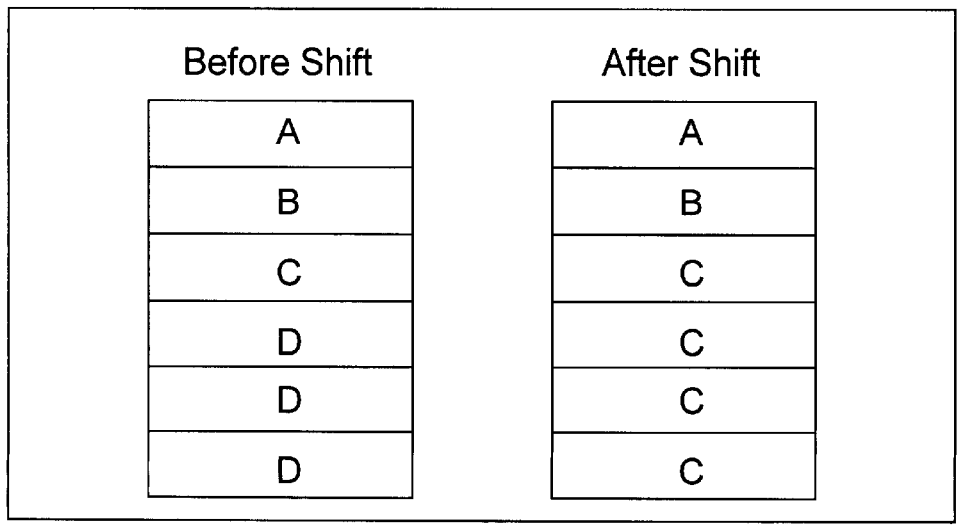
FIG. 9 illustrates the process of shifting entries in a table to provide a fast update of the table.

When an entry is deleted from the table, the update process looks at all entries between the removal point and N-1 blocks from the bottom of the current block to see if there are any duplicates entries. If the search is positive, the entry is removed by shifting data upwards to replace the current entry and extend by nearest duplicated entry by one. Otherwise, the update process looks at all entry between the removal point and N-1 blocks from the top of the current block to see if there are any unused/duplicated entries. If the search is positive, the entry is removed by shifting data downwards to replace the current entry and extend nearest unused/duplicated entry by one. The duplicate extension process for this case is illustrated in FIG. 9. If an entire block is filled with duplicated entries, then it can be put back into the free pool. If both searches fail, the amount of data shifting required will exceed the preset limit N blocks, then the shift will be stopped at the current block by duplicating the last entry in the current block.

A scenario can exist such that during insertion, the nearest unused/duplicated entry is more than N-1 blocks away in both directions and there are no more blocks in the free pool to be inserted. In this case, the update process will declare that the table is full. However, in reality, there are unused/duplicated entries, they are just too far away. It can be shown that the worst case table utilization factor is (N-1)/N. In other words, there is a chance that the update engine will declare the table is full, when in reality it is only (N-1)/N * 100 percent full through the use of the present method.

Figure 10:
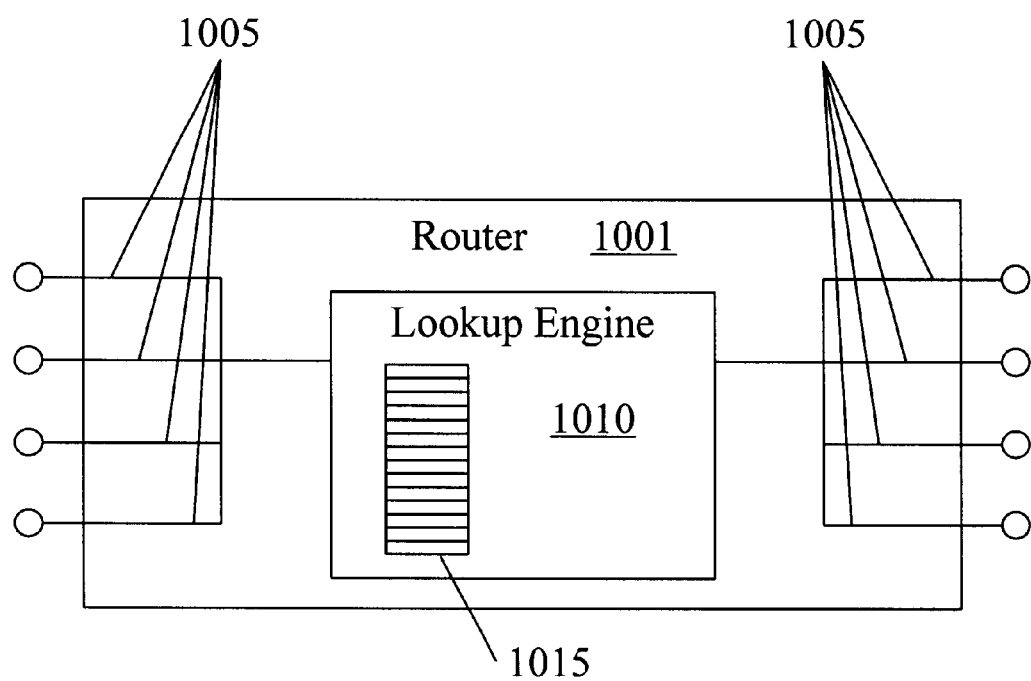
FIG. 10 illustrates a router with a lookup engine, according to one embodiment of the present invention.

An embodiment of the present invention is illustrated in FIG. 10. A router 1001 is illustrated having multiple ports 1005 for receiving incoming data packets and eventually routing those packets to another port. The router contains a lookup engine 1010, having an information table 1015 with a plurality of entries, that is used in determining a proper routing for the incoming data packets.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method of routing data on an internet router, the method comprising the steps of:

receiving an incoming data packet;

processing said incoming data packet to determine a search value;

providing at least one memory unit having a table of information including a plurality of data entries, with said table of information having a plurality of search keys associated with the plurality of data entries and with the plurality of search keys forming a tree structure based on a prefix length for each of the search keys;

expanding the plurality of search keys such that each of the plurality of search keys is a lowest level search key or has two lowest level search keys associated therewith that cover a lowest level of the tree structure and bracket a range on said lowest level;

performing a binary search of the lowest level search keys based on said search value to determine a longest prefix match; and routing said incoming data packet based on a data entry of said plurality of data entries determined by said longest prefix match;

wherein, in the expanding step, a lower valued one of said two lowest level search keys is increased by one to shift said bracketed range.

2. A method of routing data as recited in claim 1 wherein said step of providing at least one memory unit comprises providing at least one memory unit with said table of information having a plurality of search keys based on a subset of Internet Protocol Destination Addresses and wherein said step of performing a binary search comprises performing a binary search of the lowest level search keys based on an input Internet Protocol Destination Address.

3. A method of routing data as recited in claim 2 wherein said step of performing a binary search comprises performing a binary search of the lowest level search keys based on an input Internet Protocol Destination Address having a length of 32 bits.

4. A method of routing data as recited in claim 2 wherein said step of performing a binary search comprises performing a binary search of the lowest level search keys based on an input Internet Protocol Destination Address having a length of 128 bits.

5. A method of routing data as recited in claim 1 wherein said step of providing at least one memory unit comprises providing at least one memory unit having a plurality of virtual tables of information, each having a plurality of data entries, and the method further comprises:

determining a virtual tag based on said search value and setting one of said plurality of virtual tables as said table of information based on said virtual tag.

6. A method of routing data as recited in claim 1 wherein said step of performing a binary search comprises performing the binary search in a plurality of stages.

7. A method of routing data as recited in claim 1 further comprising updating the data entries in said table of information.

8. A method of routing data as recited in claim 7 wherein said step of updating the data entries in said table of information is performed concurrently with said step of performing a binary search.

9. A method of routing data as recited in claim 7 wherein said step of updating the data entries in said table of information comprises the steps of:

determining a shift in the data entries when a new data entry is added or when an existing data entry is deleted;

comparing the shift with a predetermined value;

determining an insertion point of said new data entry when said new data entry is added or a deletion point of said existing data entry when said existing data entry is deleted, based on a result of said comparing step; and inserting the new data entry at the insertion point or deleting a duplicate data entry at the deletion point.

10. An internet router comprising:

means for receiving an incoming data packet;

means for processing said incoming data packet to determine a search value;

at least one memory unit having a table of information including a plurality of data entries, with said table of information having a plurality of search keys associated with the plurality of data entries and with the plurality of search keys forming a tree structure based on a prefix length for each of the search keys;

means for expanding the plurality of search keys such that each of the plurality of search keys is a lowest level search key or has two lowest level search keys associated therewith that cover a lowest level of the tree structure and bracket a range on said lowest level;

means for performing a binary search of the lowest level search keys based on said search value to determine a longest prefix match;

means for routing said incoming data packet based on a data entry of said plurality of data entries determined by said longest prefix match;

wherein, said expanding means increases a lower valued one of said two lowest level search keys by one to shift said bracketed range.

11. An internet router as recited in claim 10 wherein said at least one memory unit comprises at least one memory unit with said table of information having a plurality of search keys based on a subset of Internet Protocol Destination Addresses and wherein said means for performing a binary search comprises means for performing a binary search of the lowest level search keys based on an input Internet Protocol Destination Address.

12. An internet router as recited in claim 11 wherein said means for performing a binary search comprises means for performing a binary search of the lowest level search keys based on an input Internet Protocol Destination Address having a length of 32 bits.

13. An internet router as recited in claim 11 wherein said means for performing a binary search comprises means for performing a binary search of the lowest level search keys based on an input Internet Protocol Destination Address having a length of 128 bits.

14. An internet router as recited in claim 10 wherein said at least one memory unit comprises at least one memory unit having a plurality of virtual tables of information, each having a plurality of data entries, and further comprises:

means for determining a virtual tag based on said search value and means for setting one of said plurality of virtual tables as said table of information based on said virtual tag.

15. An internet router as recited in claim 10 wherein said means for performing a binary search comprises means for performing the binary search in a plurality of stages.

16. An internet router as recited in claim 10 further comprising means for updating the data entries in said table of information.

17. An internet router as recited in claim 16 wherein said means for updating the data entries in said table of information is configured such the updating of data can be performed concurrently with said step of performing a binary search.

18. An internet router as recited in claim 16 wherein said means for updating the data entries in said table of information comprises:

means for determining a shift in the data entries when a new data entry is added or when an existing data entry is deleted;

means for comparing the shift with a predetermined value;

means for determining an insertion point of said new data entry when said new data entry is added or a deletion point of said existing data entry when said existing data entry is deleted, based on a result of said comparing step;

means for inserting the new data entry at the insertion point; and means for deleting a duplicate data entry at the deletion point.

* * * * *